(12) United States Patent
Cadier et al.

(10) Patent No.: US 9,025,925 B2
(45) Date of Patent: May 5, 2015

(54) RADIATION-RESISTANT RARE-EARTH-DOPED OPTICAL FIBER AND METHOD OF RADIATION-HARDENING A RARE-EARTH-DOPED OPTICAL FIBER

(75) Inventors: Benoôt Cadier, Perros Guirec (FR); Arnaud Laurent, Quemperven (FR); Thierry Robin, Camlez (FR); Sylvain Girard, Arpajon (FR); Claude Marcandella, Montlhery (FR)

(73) Assignees: Ixblue, Marly le Roi (FR); Commissariat a l'Energie Atomique et aux Energies Alternatives, Paris (FR)

( * ) Notice: Subject to any disclaimer, the term of this patent is extended or adjusted under 35 U.S.C. 154(b) by 196 days.

(21) Appl. No.: 13/806,160

(22) PCT Filed: Jul. 8, 2011

(86) PCT No.: PCT/FR2011/051635
§ 371 (c)(1),
(2), (4) Date: Dec. 21, 2012

(87) PCT Pub. No.: WO2012/004547
PCT Pub. Date: Jan. 12, 2012

(65) Prior Publication Data
US 2013/0101261 A1 Apr. 25, 2013

(30) Foreign Application Priority Data
Jul. 9, 2010 (FR) .................................... 10 55617

(51) Int. Cl.
*G02B 6/036* (2006.01)
*C03B 37/018* (2006.01)
*G02B 6/02* (2006.01)
(Continued)

(52) U.S. Cl.
CPC ....... *C03B 37/01838* (2013.01); *C03B 2201/12* (2013.01); *C03B 2201/28* (2013.01); *C03B 2201/34* (2013.01); *G02B 6/02295* (2013.01);
(Continued)

(58) Field of Classification Search
USPC ......................................................... 385/127
See application file for complete search history.

(56) References Cited

U.S. PATENT DOCUMENTS

| 4,988,162 A | 1/1991 | Hayami |
| 5,574,820 A | 11/1996 | Griscom |

(Continued)

FOREIGN PATENT DOCUMENTS

| WO | 2010/065788 A1 | 6/2010 |
| WO | 01/38244 A1 | 5/2011 |

OTHER PUBLICATIONS

International Search Report, dated Oct. 27, 2011, from corresponding PCT application.

*Primary Examiner* — Daniel Petkovsek
*Assistant Examiner* — Chad Smith
(74) *Attorney, Agent, or Firm* — Young & Thompson

(57) ABSTRACT

A radiation-resistant optical fiber includes at least one core and at least one first cladding surrounding the core. The core includes a phosphosilicate matrix, the core being rare-earth doped, the rare earth being chosen from erbium, ytterbium, neodymium, thulium or erbium-ytterbium of thulium-holmium codoped and the core is cerium codoped. Also described is a method for radiation-hardening an optical fiber including the core having a phosphosilicate matrix, the core being rare-earth doped, the rare earth being chosen from erbium, ytterbium, neodymium and thulium, or erbium-ytterbium or thulium-holmium codoped, and including a step of cerium codoping the core of the fiber.

20 Claims, 4 Drawing Sheets

(51) Int. Cl.
　　　*G02B 6/024*　　　(2006.01)
　　　*H01S 3/067*　　　(2006.01)
　　　*H01S 3/094*　　　(2006.01)
　　　*H01S 3/16*　　　(2006.01)

(52) U.S. Cl.
　　　CPC ............ *G02B 6/024* (2013.01); *G02B 6/03611*
　　　　　(2013.01); *H01S 3/0672* (2013.01); *H01S*
　　　　　*3/06729* (2013.01); *H01S 3/094007* (2013.01);
　　　　　*H01S 3/09403* (2013.01); *H01S 3/1608*
　　　　　(2013.01); *H01S 3/1618* (2013.01); *G02B 6/036*
　　　　　　　　　　　　　　　　　　　　(2013.01)

(56) References Cited

U.S. PATENT DOCUMENTS

| | | | |
|---|---|---|---|
| 5,681,365 | A | 10/1997 | Gilliland et al. |
| 6,483,973 | B1 * | 11/2002 | Mazzarese et al. ........... 385/123 |
| 2002/0071455 | A1 | 6/2002 | Heine |
| 2002/0126974 | A1 | 9/2002 | Bayart et al. |
| 2002/0154874 | A1 | 10/2002 | Ahrens et al. |
| 2004/0218653 | A1 | 11/2004 | Arbore et al. |
| 2005/0226580 | A1 * | 10/2005 | Samson et al. ................ 385/127 |
| 2011/0069723 | A1 * | 3/2011 | Dong et al. ....................... 372/6 |

* cited by examiner

RADIATION-RESISTANT RARE-EARTH-DOPED OPTICAL FIBER AND METHOD OF RADIATION-HARDENING A RARE-EARTH-DOPED OPTICAL FIBER

BACKGROUND OF THE INVENTION

The present invention relates to a radiation-resistant optical fiber and to the applications thereof in various fields. More particularly, the invention relates to an improvement of the radiation resistance of a rare-earth-doped optical fiber, and in particular to the ionizing radiations. The invention also relates to the use of such a fiber in fiber amplifiers or lasers intended to be used in the presence of radiations.

Description of the Related Art

Optical fibers have known a very strong development due to their properties of high-rate transmission of information in very constraining environments (aerial, underground, submarine). Moreover, the immunity of optical fibers to electromagnetic radiations ensures the reliability of the transmissions. The so-called standard optical fibers have found applications in the long-haul terrestrial and intercontinental communications thanks to their low linear attenuation and their high stability. In the last twenty years, the rare-earth-doped optical fibers have been developed for applications in the optical fiber amplifier and in the fiber lasers.

However, optical fibers are not fully immunized with respect to their environment but are generally sensitive to some factors such as temperature, pressure or radiations such as ionizing radiations.

As used herein, the term "radiation" means an electromagnetic or corpuscular radiation capable of directly or indirectly producing ions, or of moving atoms during its passing through the atoms and the molecules of the matter. The radiation sources may be natural (cosmic radiation in space) or artificial: radiations of photons (X-rays, γ-rays), neutrons, protons, heavy ions present in nuclear facilities, in scientific instruments or in medical devices.

The use of optical fibers in radiative environment has a major interest in the civil, military or space fields, due to the numerous advantages of the fibers and in particular their electromagnetic immunity, their wide bandwidth, their light weight and low volume. The optical fibers can be used as tools for transporting information, as sensors or as diagnostic elements. The optical fibers used in nuclear environment may be passive or active, and in the latter case, they are generally doped and used as an active medium in amplification or laser mode.

However, it has been observed that exposing an optical fiber to radiations induces a degradation of the optical performance, in particular an increase of the linear attenuation of the fiber (referred to as the Radiation-Induced Attenuation or RIA).

Many studies have been done about various types of optical fibers so as to analyze the RIA effects, to determine the causes thereof and to find treatments for improving the resistance of the optical fibers to the radiations.

On the one hand, the radiation-induced attenuation depends on the type of radiation, the dose rate and the total dose received by an optical fiber. On the other hand, the radiation-induced attenuation strongly depends on the fiber composition and varies in particular according to whether it is a fiber with a core made of pure silica, of phosphorus-doped silica, or a rare-earth-doped optical fiber.

The patent U.S. Pat. No. 5,681,365 (Gilliland et al.) describes a method for improving the radiation resistance of a silica-core optical fiber comprising doping the core with fluorine and/or applying a tension lower than 5 grams at the time of fiber drawing. The fiber is then exposed to one of the two following types of radiation sources: a γ-ray source ($^{60}$Co) having dose rate of ~100 rad/s for a total dose of 1.44-1.7 krad (14.4-17 Gy) or a K-alpha copper source of 250 kV producing a total dose of 3.8 krad (38 Gy). According to the patent U.S. Pat. No. 5,681,365, the positive impact of fluorine doping and low-tension fiber drawing and the synergy between these two factors allow reducing the RIA at the measurement wavelength of 1300 nm.

The patent U.S. Pat. No. 4,988,162 (Hayami) describes a radiation-resistant multi-core optical fiber, each of the core being made of pure silica. According to this patent U.S. Pat. No. 4,988,162 (Hayami), the reduction, in the silica core, of the chlorine impurities to OH groups and fluorine allows reducing the RIA in the visible domain when the fiber is exposed to a γ-ray source ($^{60}$Co) having a dose rate of $2.10^4$ rad/h (210 Gy/h) and for a total dose of $3.10^5$ (3.1 kGy/h).

The patent U.S. Pat. No. 5,574,820 (Griscom) describes a method for radiation-hardening a pure-silica-core optical fiber. The method comprises pre-irradiating the fiber with a radiation source (γ or fast neutrons) at a dose of at least $10^7$ rad (i.e. $10^5$ Gy) to induce a permanent attenuation in the fiber so that a subsequent exposure to a dose of radiations induces only a limited RIA at 30 dB/km at most in the visible domain (400-700 nm). The patent U.S. Pat. No. 5,267,343 (Lyons et al.) describes another method for hardening an ultrapure-silica-core fiber that combines hydrogenating, then pre-irradiating the fiber by a γ-ray source ($^{60}$Co), at a total dose going up to $10^6$ rad ($10^4$ Gy). According to U.S. Pat. No. 5,267,343, this method allows lengthening the lifetime of the fibers and also provides a protection in the UV range. However, the hydrogenation creates an absorption band in the amplification band around 1.5 μm and/or in the pumping band.

The publication of D. L. Griscom, E. J. Friebele, K. J. Long, and J. W. Fleming, "Fundamental defect centers in glass: Electron spin resonance and optical absorption studies of irradiated phosphorus-doped silica glass and optical fibers", J. Appl. Phys. 54, 3743 (1983), analyses the peaks of optical absorption induced in phosphosilicate fibers by ionizing radiations (γ source ($^{60}$Co) or X-rays of 56-100 keV). The defect of type $P_1$ is correlated to an absorption induced at 0.8 eV (~1550 nm).

Likewise, the publication of S. Girard, J. Keurinck, A. Boukenter, J-P. Meunier, Y. Ouerdane, B. Azaïs, P. Charre and M. Vié, Nucl. Instr. and Methods in Physics Res. Sec. B, Vol. 215, n° 1-2, p. 187-195, 2004, compares the RIA in various types of germanium-, nitrogen-doped and phosphorus-codoped, pure-silica-core fibers. According to this study, the phosphorus codoping is responsible for the highest permanent RIA levels after irradiation either by a γ-ray source or by a pulsed X-ray source. The predominant influence of phosphorus on the RIA is attributed to the formation of permanent phosphorus coloured centers of the POHC (Phosphorus Oxygen Hole Center) type, and $P_1$ having an absorption band around 1600 nm.

The strong radiation sensitivity of the phosphorus-doped silica-core fibers has been advantageously used for making radiation dosimeters. Hence, the publication M. C. Paul, D. Bohra, A. Dhar, R. Sen, P. K. Bhatnagar, K. Dasgupta, "Radiation response behavior of high phosphorous doped step-index multimode optical fibers under low dose gamma irradiation", Journal of Non-Crystalline Solids 355 p. 1496-1507 (2009), shows that a phosphorus-doped fiber has, in the domain of 500-600 nm, an almost-linear absorption as a function to the radiation dose of a source $^{60}$Co for low doses comprised between 0.1 and 100 rad (0.001 and 1.0 Gy). Moreover, the sensitivity of the fibers increases with the phosphorus rate.

The publication H. Henschel, M. K. Orferb, J. Kuhnhenn, U. Weinand, F. Wulf, Nuclear Instruments and Methods in Physics Research A 526 (2004) 537-550, describes the use of a phosphorus-doped optical fiber as a radiation sensor in a particle accelerator by a reflectometry measurement in the visible (670, 865 nm) or the near IR (1300 nm). The optical time-domain reflectometry measurement (OTDR) makes it possible to obtain a dosimetry system distributed along the accelerator. Moreover, the publication Henschel et al. indicates that the rare-earth-doped active optical fibers are extremely sensitive to the ionizing radiations.

Among the active fibers, the erbium-doped fiber is of major interest. Indeed, the erbium-doped fibers allow the making of amplifiers or lasers with an emission wavelength located around 1500 nm, commonly referred to as the third telecom band. The erbium-doped fibers also enter in the making of so-called "ASE" wideband sources, of communication amplifiers of the EDFA type, and of fibered lasers, which are used for example for free space communication applications or for making LIDARs.

Most often, the core of an erbium-doped silica fiber is codoped with germanium, or even with aluminum. A particular branch of the erbium-doped fibers is the branch of the erbium-ytterbium-codoped fibers. Theses fibers are an alternative to the simply erbium-doped fibers, more particularly for high-power applications. FIG. 1 shows a sectional view of a double-cladding optical fiber. The optical fiber 5 comprises a rare-earth-doped core 1, surrounded by a first pump-guiding cladding 2, surrounded by a second cladding 3. The fiber 5 comprises an outer protective coating 4.

FIG. 2 shows the various levels of energy of the ytterbium and erbium ions in an erbium-ytterbium-codoped material. In an erbium-ytterbium-codoped fiber, the erbium ion is not excited directly by a 976-nm single-mode pump on the level $^4I_{11/2}$ of the erbium, but is excited indirectly via single mode pumping in the absorption band between 900 and 980 nm of the ytterbium ions, i.e. on their level $^2F_{7/2} \rightarrow {}^2F_{5/2}$. The ytterbium ions then transfer their energy to the erbium ions via transfers of the phonon type. Now, the phonon energy of the link P=O (phosphorus-oxygen) is ideally adapted to this energy transfer. To improve the energy transfer between the ytterbium and the erbium, the core of an erbium-ytterbium-codoped silica optical fiber is made in a conventional way with phosphorus doping. Phosphorus is then used both to increase the refractive index of the core and to fulfill the function of energy transfer between the rare earth elements. The use of a phosphosilicate matrix in the fiber core, rather than a pure-silica matrix, has also for indirect effect to increase the lifetime of the level $^2F_{5/2}$ of the ion $Yb^{3+}$, which limits the emission at 1 μm of this rare earth, and to reduce the lifetime of the level $^4I_{13/2}$ of the $Er^{3+}$, which limits the phenomenon of reverse transfer.

However, as mentioned hereinabove, the phosphorus is a dopant of the silica known to have a strong impact on the radiation resistance of the silica-based optical fibers. Indeed, the presence of phosphorus induces a strong radiation sensitivity of the optical fiber, which results in an excessively high level of the attenuation induced during irradiation and in an absence of recovery of the transmission capacities of the optical fiber after irradiation, contrary to most of the other types of optical fibers. This strong sensitivity is particularly marked in the infrared due to the generation of a defect relating to the phosphorus, the center $P_1$ that has an absorption band centered around 1600 nm, very close to the third telecom window. Moreover, the defect concentration increases even after the end of irradiation due to the thermal conversion of other defects into defects $P_1$.

Accordingly, the phosphorus element is generally banished both in the core and in the optical cladding of any rare-earth-doped optical fiber intended to be used as a laser source or an optical amplifier in a radiative environment. The phosphosilicate-matrix, erbium-ytterbium-codoped, double-cladding fibers are thus commonly prohibited in a radiative medium, their strong radiation sensitivity in the third telecom band (around 1.5 μm) being mainly associated to the presence of phosphorus defects.

This radiation sensitivity of the rare-earth- and/or phosphorus-doped optical fibers prevents from using the fibers for applications of laser transmission, amplification or emission in the mediums where the ionizing radiations are naturally present (for example, in space) or produced (nuclear reactor environment). Indeed, the performance of the fiber amplifiers or the fiber lasers is liable to degrade very rapidly as a function of the received radiation dose.

The radiation-induced attenuation is only partially reversible over time, by thermal-bleaching or photo-bleaching processes. However, in certain environments, as in the spatial field, the radiations are permanent and the bleaching processes are impracticable.

A lot of works have been done for increasing the radiation resistance of optical fibers. As used herein, the phrase "radiation resistance", applied to an optical fiber, means the resistance of a fiber to an increase of its linear attenuation when exposed to radiations such as X-rays, neutrons, gamma-rays or others. Generally, the radiation resistance may be measured by the attenuation induced by the exposure to the radiations, by the recovering rate, or by the time required for a partial or total recovery.

There exists a need for fiber amplifiers or lasers operating in the third telecom band (~1.5 μm) and being radiation-resistant, i.e. having a low radiation-induced attenuation. It is for example desirable that optical amplifiers or fiber lasers can operate in optical systems installed in a nuclear or spatial environment. Therefore, there exists a need to make a radiation-resistant rare-earth-doped optical fiber.

SUMMARY OF THE INVENTION

The present invention aims to remedy these drawbacks and more particularly relates to a radiation-resistant optical fiber comprising at least one core and at least one first cladding surrounding said core. According to the invention, said core comprises a phosphosilicate matrix, said core being doped with a rare earth element chosen from erbium, ytterbium, neodymium, thulium, or being erbium-ytterbium codoped or thulium-holmium codoped, and said core is codoped with cerium.

According to various particular embodiments of the invention:
- the core is erbium doped or erbium-ytterbium codoped and the ratio between the erbium concentration and the cerium concentration (Er/Ce) in the fiber core is between 0.05 and 50;
- the fiber core is erbium-ytterbium codoped and the concentration ratio Yb/Er in the fiber core is between 5 and 50;
- the erbium concentration is between 100 and 1000 ppm, the ytterbium concentration is between 500 and 10000 ppm, the phosphorus concentration is between 2 and 10 at. % (atomic percent), and the cerium concentration is between 500 and 10000 ppm;

the fiber comprises a second cladding surrounding the first cladding;

the core further comprises hydrogen and/or fluorine;

the fiber is a polarizing or polarization-maintaining fiber;

the fiber is a micro-structured fiber or a photonic fiber comprising a cladding made of hollow capillaries;

the fiber comprises a bandgap structure;

the fiber is a large-mode-area fiber.

The invention also relates to a radiation-resistant optical-fiber amplifier comprising an optical fiber according to one of the embodiments described.

The invention also relates to a radiation-resistant optical-fiber laser comprising an optical fiber according to one of the embodiments described.

The invention also relates to a method for radiation-hardening an optical fiber comprising a phosphosilicate-matrix core, said core being doped with a rare earth chosen from erbium, ytterbium, neodymium, thulium, or being erbium-ytterbium codoped or thulium-holmium codoped. According to the invention, the hardening method comprises a step of cerium codoping said core of the optical fiber.

According to particular embodiments of the method of the invention, the method further comprises the following step(s), applied alone or combined with each other:

fluorine codoping the core and/or the cladding of said fiber;

hydrogenating said optical fiber.

The invention also relates to a method for manufacturing an active, radiation-resistant optical device using a rare-earth-doped optical fiber comprising a phosphosilicate-matrix core, said core being doped with a rare earth chosen from erbium, ytterbium, neodymium, thulium, or being erbium-ytterbium codoped or thulium-holmium codoped. According to the invention, said core is cerium codoped so that said fiber has an increased radiation resistance.

According to a particular embodiment, the method of the invention relates to the manufacturing of an optical device chosen from: a rare-earth-doped optical-fiber amplifier, a fiber laser, a wideband source.

The invention will find a particularly advantageous application in the manufacture of laser sources, of optical amplifiers intended to be used in a radiative environment. The invention specially opens up the way to the use of rare-earth-doped fibers in space, and in particular, to the making of LIDARs and inter-satellite communications based on such radiation-resistant optical fibers.

The present invention also relates to the characteristics that will be revealed by the following description and that will be considered either alone or in any technically possible combination thereof.

BRIEF DESCRIPTION OF THE DRAWING FIGURES

This description is given by way of non-limitative example and will allow a better understanding of how the invention can be implemented, with reference to the appended drawings, in which.

DETAILED DESCRIPTION OF THE INVENTION

Figure 1:
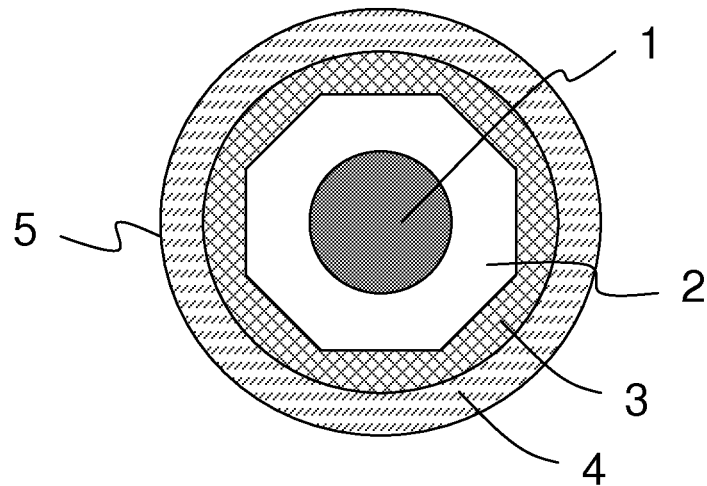
FIG. 1 shows a sectional view of an optical fiber.
Figure 2:
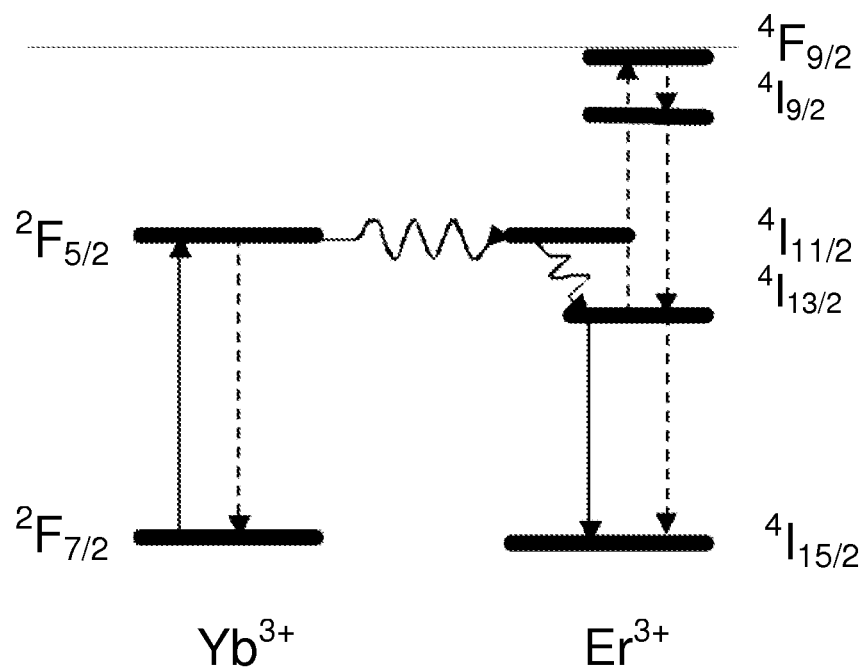
FIG. 2 shows a diagram of the levels of energy of the erbium and ytterbium ions and of the energy transfers between the various levels of energy.

First will be described a method of making an optical fiber according to a preferred embodiment of the invention, where the fiber has an erbium-ytterbium-codoped core.

A preform is made by the MCVD technique, and more particularly by a variant of this technique, referred to as "doping in solution". A porous preform is made in a deposition tube which is generally a tube of pure silica. The porous preform is mainly consisted of silica and phosphorus, but other elements may be incorporated. This porous preform is placed in presence of an aqueous solution containing the following elements in the form of salts: $ErCl_3$, $YbCl_3$ and $CeCl_3$. This solution is aqueous-based, but other solutions, in particular alcoholic solutions, may be contemplated. Once the solution has been removed from the tube, the porous preform is dried and vitrified on the CVD bench. And finally, the preform is closed so as to produce a solid preform containing a phosphosilicate core doped with the rare earth elements erbium (Er), ytterbium (Yb) and cerium (Ce). This list of codopants of the core is not limitative and other known elements may be added according to the desired applications.

Other techniques of manufacturing the core and/or the preform are possible, such as using chelates, nanoparticles, VAD (Vapor Axial Deposition), OVD (Outside Vapor Deposition), PCVD (Plasma Chemical Vapor Deposition), Sol/Gel techniques, etc.

The preform obtained is thereafter shaped by conventional glass-making techniques so as to obtain the desired homothetic core/cladding ratio. The geometry of the preform may be modified so as to obtain an efficient scrambling of the multimode pump. For example, it may be made a cladding whose section is octagonal or pseudo-octagonal, hexagonal, with one flat, with two flats, etc.

A second cladding may be formed by refilling or sleeving the primary preform with the fluorinated silica. This structure makes it possible to obtain a "full-glass" double-cladding fiber. A fluorinated-silica cladding has generally a numerical aperture (N.A.) between 0.22 and 0.30 at most. A second cladding may also be formed from a low index polymer, which makes it possible to obtain a N.A. typically higher than 0.40. However, a second fluorinated cladding is particularly interesting for the hardening applications, because fluorinated silica ages better than polymers.

The preform is then drawn into a fiber, using possibly a plastic cover of the acrylate, silicone type, etc., whose main quality is to have a particularly low refractive index with respect to silica (or a high numerical aperture, for example >0.4).

A double-cladding fiber 5 is obtained, which comprises a core 1 comprising erbium-ytterbium-codoped and cerium-codoped, phosphorus-doped silica.

The phosphorus content in core 1 is, for example, higher than 4 at. % and, if possible, higher than 6%, and ideally higher than 8%, to allow dilution of the rare-earth ions and to improve the pumping efficiency.

The absorptions of erbium and ytterbium ions measured in the core before irradiation are respectively of the order of:
  5 to 100 dB/m at the wavelength close to 1530 nm.
  100 to 2500 dB/m at the wavelength close to 976 nm.
  The atomic ratio Yb/Er in the core may be of 5 to 50, but ideally of 12 to 25.
  The cerium is added in such a manner that the concentration ratio Yb/Ce is between 0.1 and 10.

According to a preferred embodiment of the invention, measurements of which under exposure to radiations will be presented hereinafter, the composition of the fiber is:
  Phosphorus concentration in the core: 8 at. %
  Ratio Yb/Er: 21
  Ratio Ce/Er: 10
  Doped core diameter 6 µm
  Doped core numerical aperture: 0.19
  Mean diameter of the octagon 130 µm of the first cladding
  Numerical aperture of the multimode cladding: >0.46
  Maximum absorption of erbium around 1536 nm before irradiation: 30 dB/m
  Multimode absorption of the double-cladding fiber around 915 nm before irradiation: 0.8 dB/m.

Figure 3:
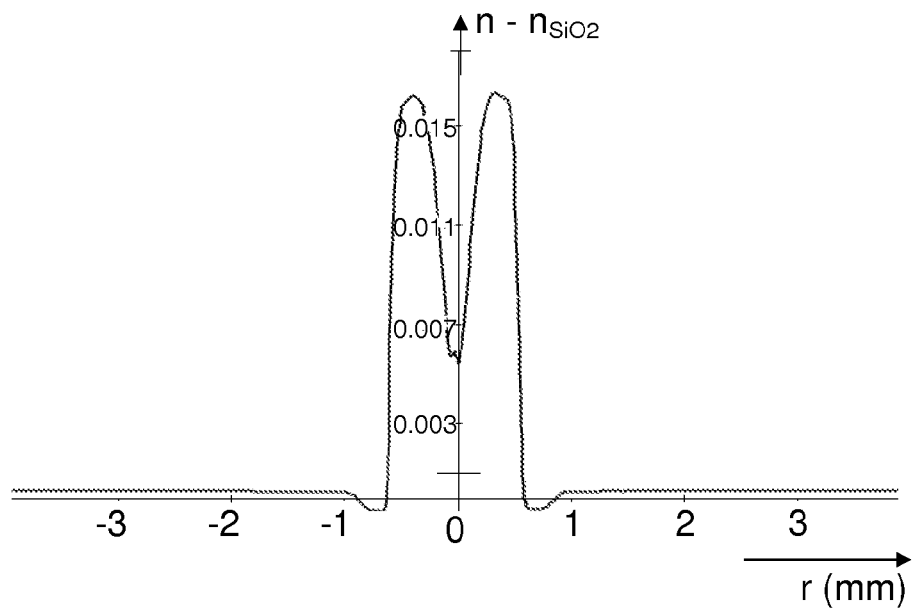
FIG. 3 shows an index profile of a preform for manufacturing a radiation-hardened, erbium/ytterbium double cladding fiber.

The index profile of the preform at the base of this optical fiber is shown in FIG. 3. It is shown a profile of relative refractive index with respect to the pure silica ($n_{SiO2}$).

Other rare-earth-doped optical fibers may be manufactured with numerical values different from those indicated hereinabove, while remaining within the scope of the invention. In particular, the fiber core may be doped with a rare earth chosen from erbium, ytterbium, thulium or neodymium, or codoped with a couple of rare earth elements: erbium-ytterbium or thulium-holmium.

Measurements have been taken on an erbium-ytterbium-codoped fiber without cerium (Fiber I) and an erbium-ytterbium- and cerium-codoped fiber according to the invention (fiber J), respectively, in amplifier mode, under pump flows and during exposure to a source of Cobalt 60 (gamma photons of 1.2 MeV, dose rate of the order of 1 krad/h, i.e. 10 Gy/h).

Figure 4:
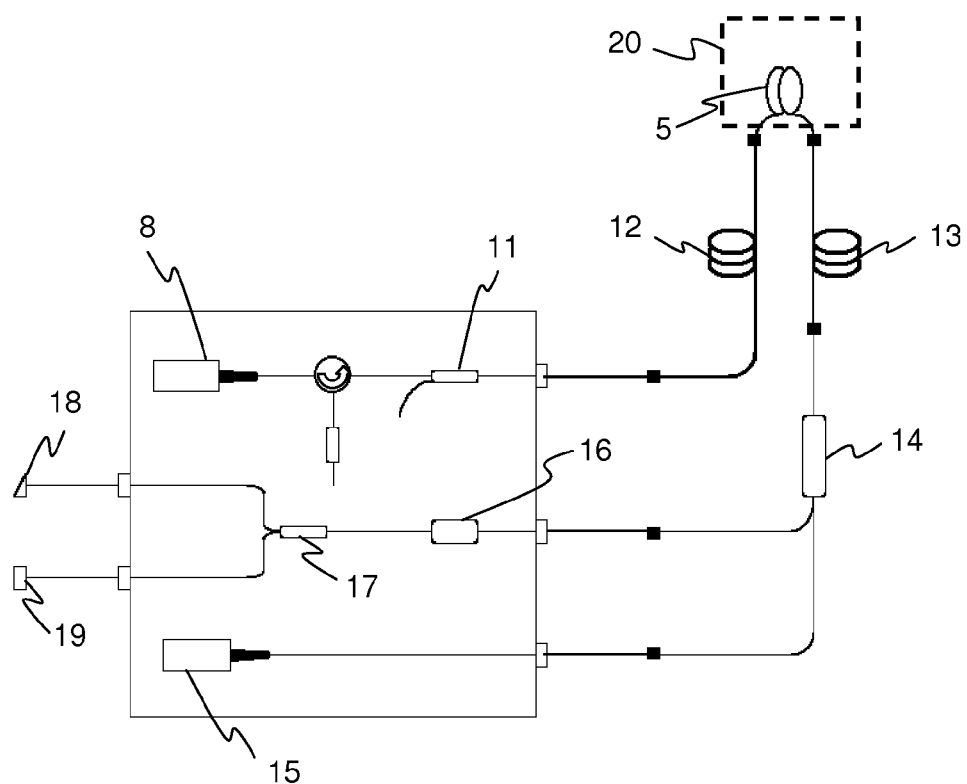
FIG. 4 shows a principle scheme of measuring the effects of the Er/Yb optical fiber irradiation on the characteristics of an amplifier, by in-line measurement of the evolution of the amplifier output power under irradiation (spectrum and power measurement)

FIG. 4 shows a device for measuring the performance of an optical fiber 5 placed in an enclosure 20 exposed to a source of ionizing radiations during the operation of said fiber 5 in amplifier mode. The optical fiber 5 to be tested is merged at each end with an optical fiber 12 and 13, respectively. A 1545-nm source 8 is coupled to the input of the SMF fiber 12. A multiplexer 11 makes it possible to also couple a 980-nm pump to the fiber 12. A second fiber 13 is coupled at the other end of the codoped optical fiber 5. A multimode pump 15 is coupled to another end of the fiber 13. An output coupler 14 makes it possible to transmit the signal amplified by an amplifier 16 towards a divider 17 that distributes the signal between an integrating sphere 18 and an optical spectrum analyzer (OSA) 19. The fiber 5 is placed in an enclosure 20, where it is subjected to the radiation of a α-ray $^{60}$Co source during its operation as an optical amplifier. Only the fiber 5 is exposed to the radiation of the $^{60}$Co source.

The radiation sensitivity of this hardened optical fiber has been evaluated with a $^{60}$Co source (gamma photons of 1.2 MeV, dose rate of 1 krad/h (10 Gy/h), ambient temperature, doses lower than 100 krad (1 kGy)). As it has been shown that the measured responses for the doped optical fiber under gamma irradiation are representative of their responses under continuous protons, neutrons irradiations (S. Girard, J. Baggio, and J. Bisutti, "14-MeV Neutron, gamma-ray, and Pulsed X-Ray Radiation-Induced Effects on Multimode Silica-Based Optical Fibers", IEEE Transactions on Nuclear Sciences, vol. 53, n° 6, pp. 3750-3757, 2006 et Todd S. Rose, Deana Gunn and George C. Valley, "Gamma and Proton Radiation Effects in Erbium-Doped Fiber Amplifiers: Active and Passive Measurements", IEEE Journal of Lightwave Technology, Vol. 19, Issue 12, pp. 1918-(2001)), the tested fiber is also resistant to these various types of irradiations.

The measurement bench used for the characterization of the response of the two optical fibers under gamma irradiation is detailed in FIG. 4. The active fiber 5, a basic component of the optical amplifier, is installed in an irradiation zone 20, facing the incident flux of gamma photons. The remaining of the amplifier is displaced in a measurement rack, by means of two remoting optical fibers 12 and 13 of 30 m long, towards a so-called instrumentation zone, which is radiation-protected. The test bench is consisted of a rack in which are integrated all the control equipments, i.e.:
  power supplies of the DFB source 8 and of the pump diode,
  measurement equipments, optical spectrum analyzer 19, integrating sphere 18,
  bench-top containing the active and passive optical assembly of the amplifier,
  pump combiners 11, 14,
  PC with automatic test and acquisition program.

A fiber 5 is assembled to the remoting fibers 12, 13 and to a pump combiner 11, 14, in the form of an easy-to-handle bench. This bench makes it possible to characterize the optical power P (W) and the energy spectrum of the signal amplified at 1545 nm for various pump values of the active fiber (current between 0 and 7 A) before, during and after a gamma irradiation. It is therefore possible to characterize, by means of this measurement bench, the degradation of the amplifier linked to the sensitivity of the active fiber under irradiation.

Two amplifiers are made, the first one using a phosphosilicate-matrix erbium-ytterbium fiber without cerium (Fiber I), and the second one using a phosphosilicate-matrix erbium-ytterbium optical fiber containing cerium (Fiber J). Each of the fibers, without cerium doping (Fiber I) and with cerium doping (Fiber J), respectively, is tested individually on the measurement device shown in FIG. 4.

Figure 5:
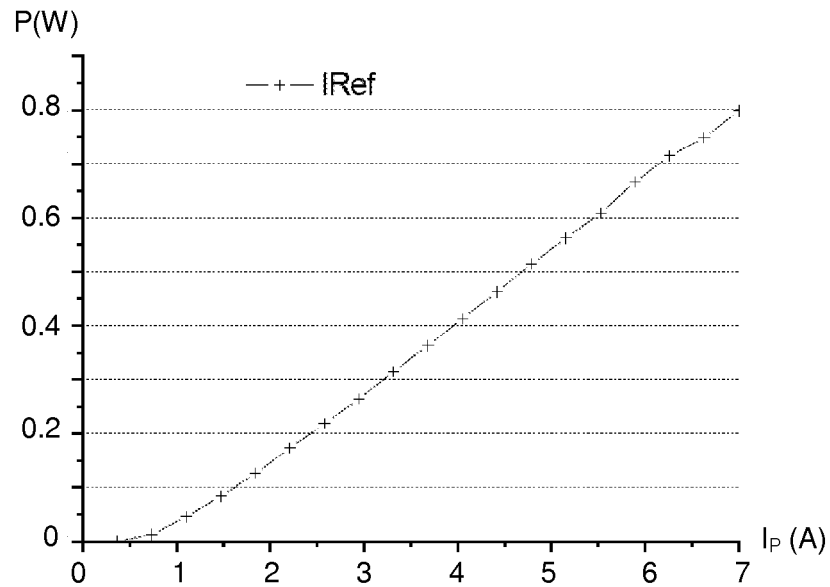
FIG. 5 shows the evolution of the output current as a function of the pump diode current for an amplifier using a fiber I without cerium codoping.
Figure 6:
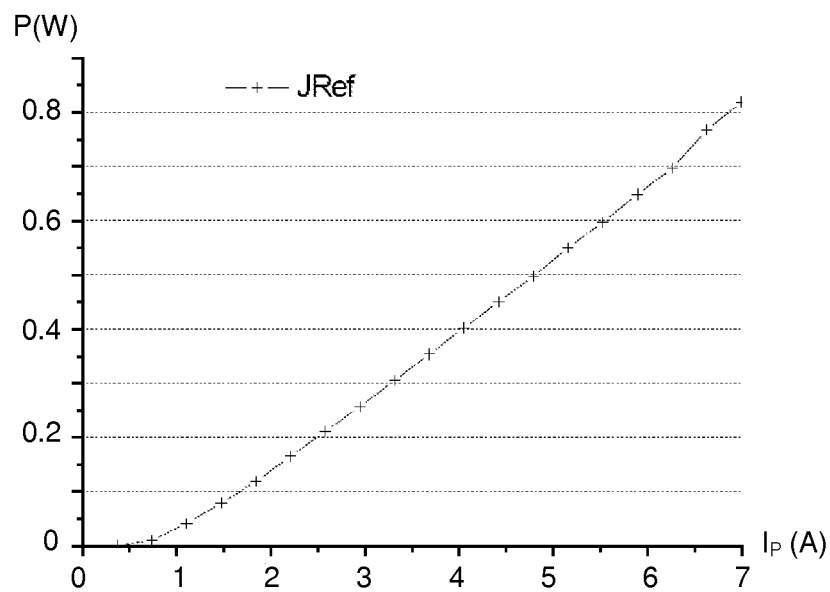
FIG. 6 shows the evolution of the output current as a function of the pump diode current for an amplifier using a cerium-codoped fiber J.

FIG. 5 shows the evolution of the output power at 1545 nm as a function of the pump diode current for an amplifier using a fiber I without cerium doping and before irradiation by the $^{60}$Co source. In similar conditions, FIG. 6 shows the evolution of the output power at 1545 nm as a function of the pump diode current for an amplifier using a cerium-codoped fiber J and before irradiation by the $^{60}$Co source. These power measurements have been taken via the integrating sphere.

The comparison of FIGS. 5 and 6 indicates that the characteristics of the two amplifiers (using respectively Fiber $I_{ref}$ and Fiber $J_{ref}$) are very close to each other before exposure to a radiation source. The addition of cerium in Fiber J does not affect the optical performance when the optical amplifier is not irradiated.

Figure 7:
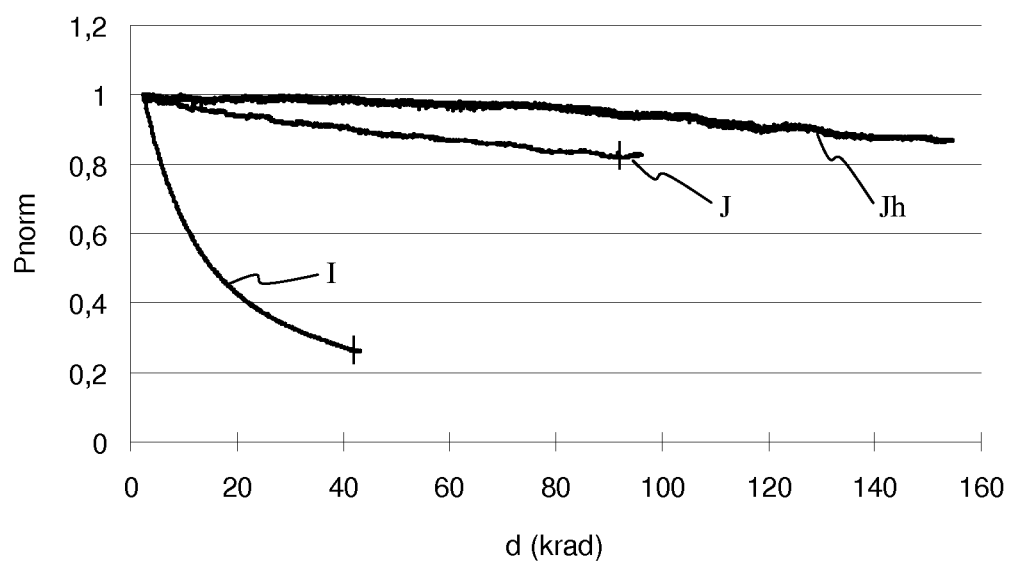
FIG. 7 shows the evolution of the amplifier output power during irradiation for the optical fibers I and J, respectively, at ambient temperature (dose rate of 1 krad/h or 10 Gy/h), as well as for a cerium-codoped and hydrogenated fiber Jh.

FIG. 7 shows a measurement of the output power at 1545 nm, at the output of each of the two amplifiers (using respectively Fiber I and Fiber J) as a function of the time of exposure of the fiber 5 to a radiation dose of the $^{60}$Co source, for respectively Fiber I and Fiber J. FIG. 7 shows a measurement of the output power at 1545 nm, at the output of an amplifier using a cerium-codoped fiber Jh, having a structure and a composition similar to those of Figure J, fiber Jh being moreover hydrogenated. The output power of each amplifier is herein normalized relative to the initial power before the beginning of exposure to radiations (power normalized to 1 for a zero radiation dose). Fiber I is exposed to the $^{60}$Co source up to a dose of 40 krad, then the exposure of the fiber is stopped but the measurement is continued for still some time. Fiber J is exposed to the $^{60}$Co source up to a dose of 90 krad (900 Gy), then the exposure of Fiber J is stopped and the measurement is continued for some time. Fiber Jh is exposed to the $^{60}$Co source up to a dose of 160 krad.

Under irradiation, defects are generated at the microscopic scale in the doped silica constituting the optical fiber. The generation of these defects at the atomic scale results, at the macroscopic scale, in a reduction of the signal emitted at 1545 nm, illustrated in FIG. 7, for the two optical fibers (Fiber I and Fiber J), respectively.

However, a degradation of the output optical power of the amplifier for a convention fiber (Fiber I) can be observed in FIG. 7, such degradation being such that it can practically be talked about extinction of the emitted signal. On the other hand, the degradation of the amplifier using the cerium-doped fiber J is limited to less than 20% of the initial power for the equivalent in total dose of the duration of a conventional spatial mission (>80 krad ($SiO_2$), i.e. 800 Gy). The degradation of the amplifier using the cerium-codoped and hydrogenated fiber Jh is still considerably reduced with respect to Fiber J.

Hence, FIG. 7 shows clearly an improvement of the resistance of the optical fiber J under irradiation, thanks to the addition of cerium in the core of the optical fiber. After a dose of 40 krad (400 Gy), the power at 1545 nm has reduced by about 80% in the reference fiber I and only of less than 20% in the case of the cerium-codoped fiber J after a deposited dose higher than 80 krad (800 Gy), which exceeds most of the doses met in spatial applications. FIG. 7 shows a considerable improvement of the resistance of the optical fiber Jh under irradiation thanks to the combined effects of hydrogenation and addition of cerium in the core of the optical fiber.

Furthermore, FIG. 7 shows the evolution of Fibers I and J after stopping the exposure to ionizing radiations (stopping represented by a small vertical dashed line on each curve), i.e. after 40 krad (400 Gy) for Fiber I and after 90 krad (900 Gy) for Fiber J, respectively. After stopping the irradiation of Fiber I, the measured level of optical power seems to be constant, which seems to indicate permanent defects in Fiber I. On the contrary, after stopping the irradiation of Fiber J, the measured level of optical power presents a slight inflection, which seems to indicate a beginning of bleaching of the defects in this Fiber J and thus a partial recovery of its capacity of transmission.

Even so, the effect of improvement of the radiation resistance of an optical fiber J with an erbium-doped and cerium-codoped phosphosilicate core is an effect newly highlighted by the present invention and whose underlying physical mechanisms for that effect are not explained. This effect was by no means expectable. On the contrary, based on the extensive prior art literature, the one skilled in the art would not expect that cerium codoping the core of an optical fiber comprising phosphorus and erbium would produce a fiber that is more resistant to the ionizing radiations than a fiber without cerium codoping.

The invention thus also relates to a method for radiation-hardening a phosphosilicate matrix, erbium-doped or erbium-ytterbium-codoped optical fiber, comprising a step of cerium codoping the core of said optical fiber. The codoping is preferably made during the manufacturing of the core of the fiber preform.

The invention also makes it possible to manufacture an active, radiation-resistant, optical-fiber device using an optical fiber according to one of the embodiments described in the present document.

The radiation-hardening properties described in the present document allow contemplating the production of fibers with different structures for applications in radiative environment (civil, military nuclear activities, high energy physics) and in particular with a structure of the type:

Double-cladding Air-Clad, so as to further reinforce the radiation-resistance of the optical fiber. The low-index cladding of the silicone or acrylate type is replaced by a row of capillaries forming a layer of air around the multimode part of the optical fiber;

Micro-structured fiber containing portions of core doped with the material hardened as described hereinabove, in particular so-called "photonic bandgap fibers";

Polarization-maintaining or polarizing fibers;

Large-mode-area fiber;

Fiber comprising a so-called " bandgap " structure.

Any other type of optical fiber intended to make an optical laser or amplifier in the band around 1.5 μm of the erbium and operating in the presence of radiations is also within the scope of the invention.

In particular, according to a particular embodiment of the invention, hydrogenation of the fiber is made to reinforce the radiation-hardening effect.

According to a particular embodiment of the invention, which may be used alone or in combination with hydrogenation, a codoping of the core and/or of the cladding of the fiber is made to reinforce the effect of radiation-hardening of the fiber according to any one of the embodiments described hereinabove.

The invention allows an improvement of the radiation resistance of the fibers, in particular for a phosphosilicate-matrix, erbium-ytterbium fiber, by adding cerium in the composition of the core.

The rare-earth-doped optical fiber of the invention has an increased radiation resistance. The attenuation induced by irradiation in the fiber of the invention remains lower than the attenuation induced by irradiation in a rare-earth-doped fiber without cerium codopant. Moreover, the optical fiber of the invention is also tolerant to non-strictly ionizing radiations such as neutrons or protons.

The invention claimed is:

1. A radiation-resistant optical fiber which is resistant to ionizing radiations, comprising:
   at least one core (1); and
   at least one first cladding (2) surrounding said core (1), wherein,
   said core (1) comprises a phosphosilicate matrix,
   said core (1) is doped with a rare earth element chosen from erbium, ytterbium, neodymium, thulium, or being erbium-ytterbium codoped or thulium-holmium codoped, and
   said core (1) is codoped with cerium, and a phosphorus concentration is between 2 and 10 atomic %, and the cerium concentration is between 500 and 10000 ppm.

2. The optical fiber according to claim 1, characterized in that the core is erbium doped or erbium-ytterbium codoped and in that the ratio between the erbium concentration and the cerium concentration (Er/Ce) in the fiber core is between 0.05 and 50.

3. The optical fiber according to claim 2, characterized in that the core is erbium-ytterbium codoped and in that the ratio of the concentrations Yb/Er in the core of the fiber is between 5 and 50.

4. The optical fiber according to claim 3, characterized in that the erbium concentration is between 100 and 1000 ppm, the ytterbium concentration is between 500 and 10000 ppm.

5. The optical fiber according to claim 1, characterized in that the fiber comprises a second cladding surrounding the first cladding.

6. The optical fiber according to claim 1, characterized in that the core further comprises hydrogen and/or fluorine.

7. The optical fiber according to claim 1, characterized in that the fiber is a polarizing or polarization-maintaining fiber.

8. The optical fiber according to claim 1, characterized in that the fiber is a micro-structured fiber or a photonic fiber comprising a cladding made of hollow capillaries or the fiber comprises a bandgap structure, or the fiber is a large-mode-area fiber.

9. A radiation-resistant optical-fiber amplifier comprising an optical fiber according to claim 1.

10. A radiation-resistant fiber laser comprising an optical fiber according to claim 1.

11. A method for radiation-hardening an optical fiber to ionizing radiations, comprising a phosphosilicate-matrix core, said core being doped with a rare earth chosen from erbium, ytterbium, neodymium, thulium, or being erbium-ytterbium codoped or thulium-holmium codoped; and a step of cerium codoping said core of the optical fiber so that a phosphorus concentration is between 2 and 10 atomic %, and the cerium concentration is between 500 and 10000 ppm.

12. The method according to claim 11, characterized in that it comprises an additional step of fluorine codoping the core and/or the cladding of said fiber.

13. The method according to claim 11, characterized in that it comprises an additional step of hydrogenating said optical fiber.

14. A method for manufacturing an active, radiation-resistant optical device using a rare-earth-doped optical fiber comprising a phosphosilicate-matrix core, said core being doped with a rare earth chosen from erbium, ytterbium, neodymium, thulium, or being erbium-ytterbium or thulium-holmium codoped, said core being cerium codoped so that said fiber has an increased radiation resistance, wherein a phosphorus concentration is between 2 and 10 atomic %, and the cerium concentration is between 500 and 10000 ppm.

15. The method according to claim 14, characterized in that said optical device is chosen from: a rare-earth-doped optical-fiber amplifier, a fiber laser, a wideband source.

16. The optical fiber according to claim 2, characterized in that the core is erbium-ytterbium codoped and in that the ratio of the concentrations Yb/Er in the core of the fiber is between 5 and 50.

17. The method according to claim 12, characterized in that it comprises an additional step of hydrogenating said optical fiber.

18. The optical fiber according to claim 1, wherein,
said core is erbium-ytterbium codoped, and
said at least one first cladding surrounding said core is a fluorinated-silica double-cladding having a numerical aperture (N.A.) higher than 0.40.

19. The optical fiber according to claim 18, wherein the ratio of the concentrations Yb/Er in said core is between 12 and 25.

20. The optical fiber according to claim 18, wherein the concentration ratio Yb/Ce is between 0.1 and 10 in said core.

* * * * *